United States Patent Office 2,821,146
Patented Jan. 28, 1958

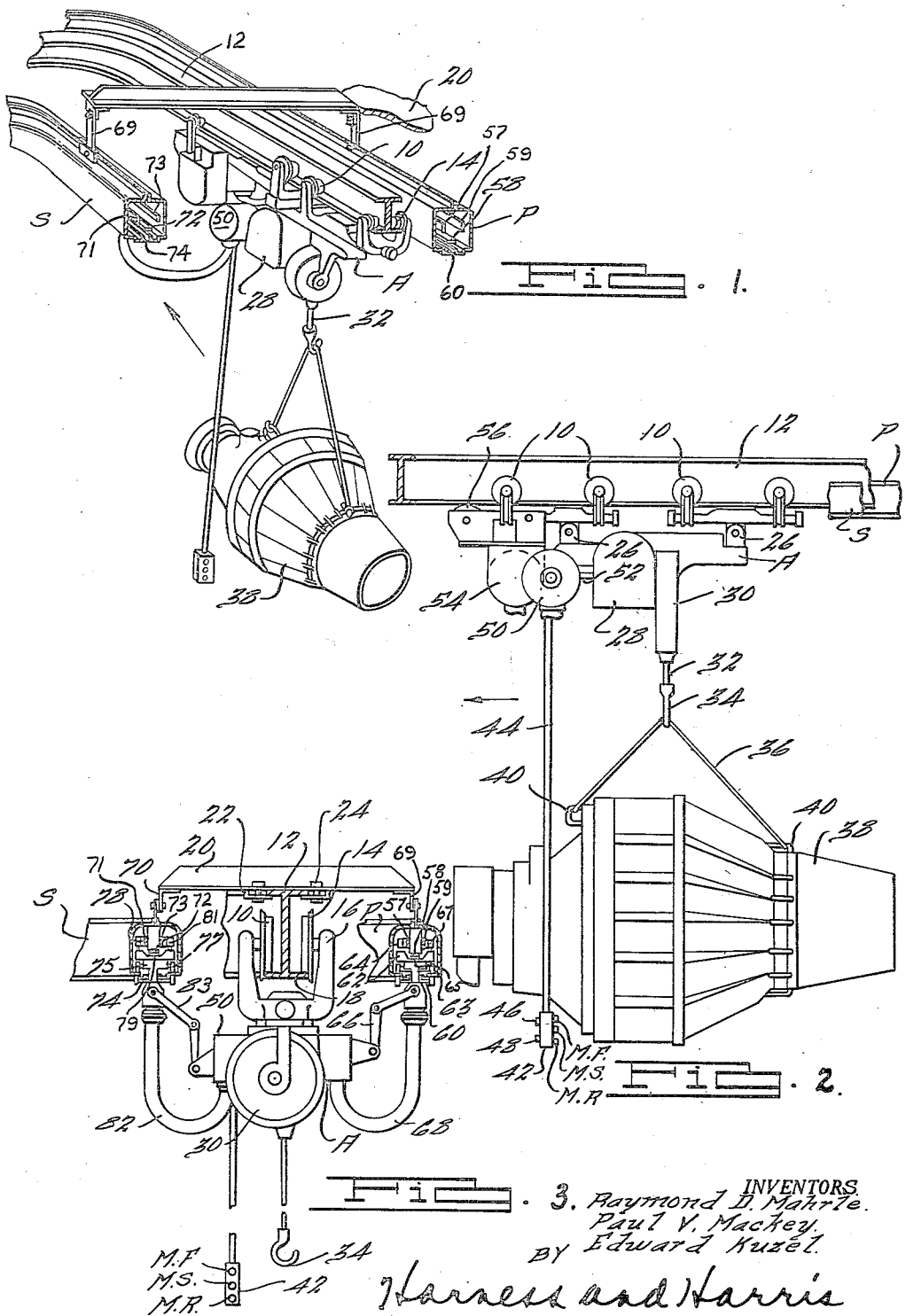

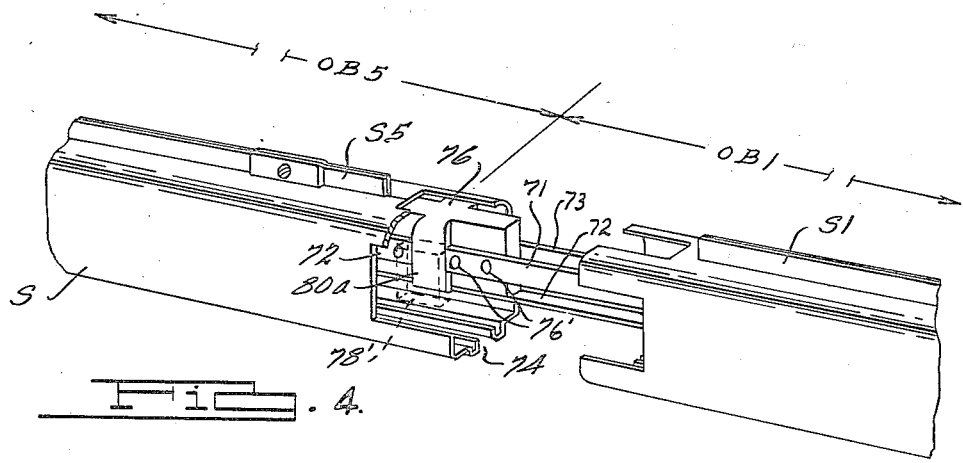

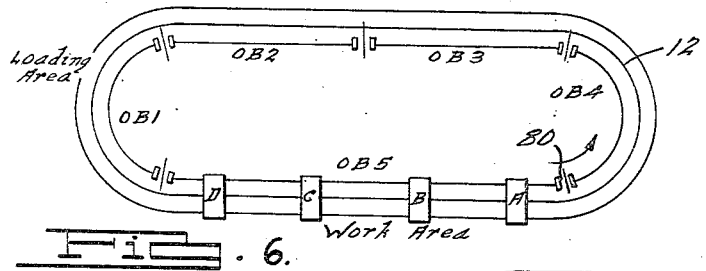
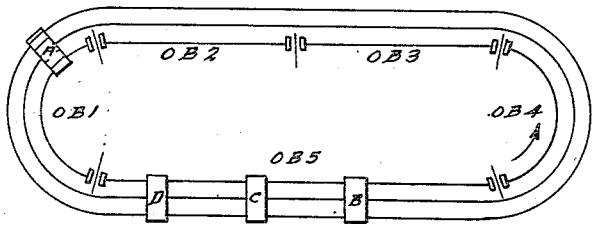
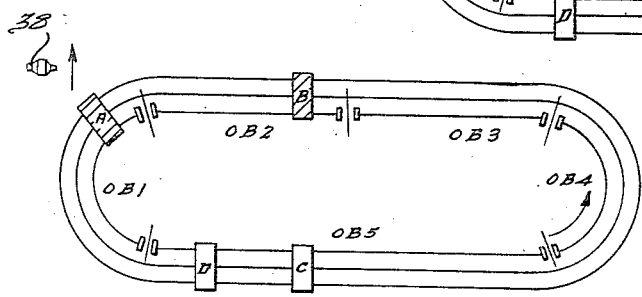
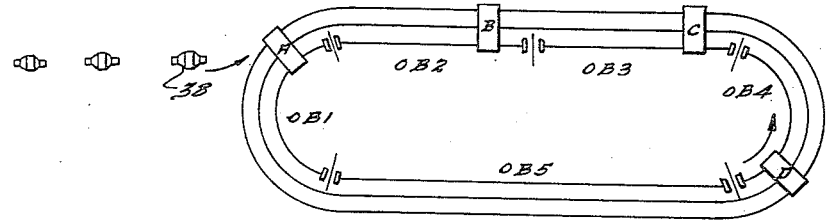
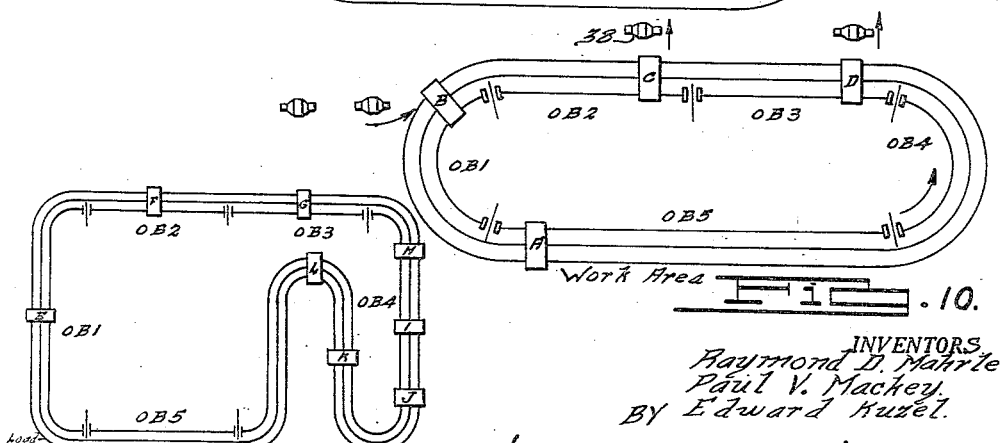

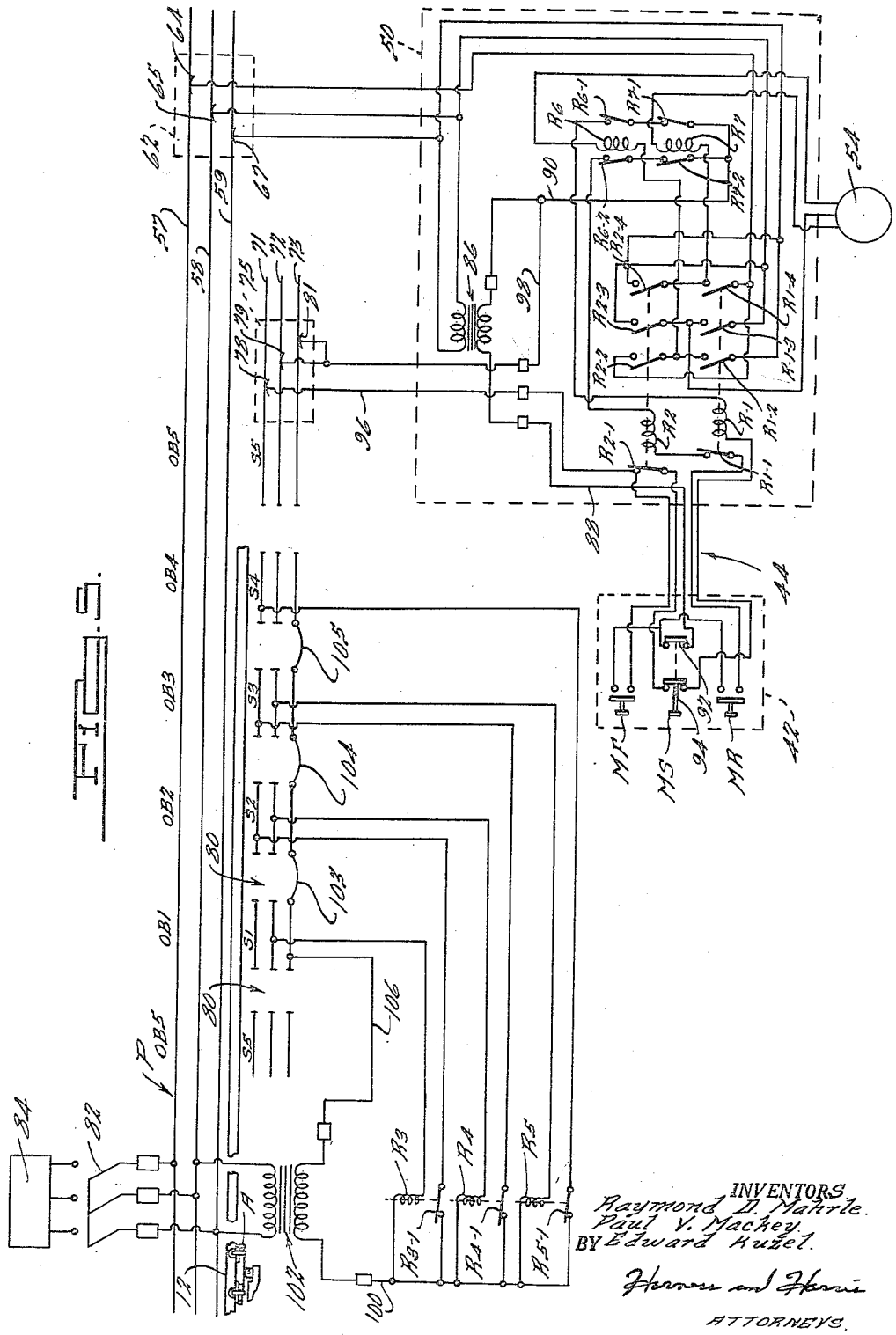

2,821,146

AUTOMATIC SECTIONAL CONTROL SYSTEM FOR TRACK-BORNE CARRIERS

Raymond D. Mahrle, Detroit, Paul V. Mackey, Mount Clemens, and Edward Kuzel, Detroit, Mich., assignors to Chrysler Corporation, Highland Park, Mich., a corporation of Delaware Application August 2, 1952, Serial No. 302,314

5 Claims. (Cl. 104—148)

The present application relates to an automatic sectional control system for track-borne carriers, particularly track-borne materials carriers which move on a closed loop of track.

In handling materials and manufactured products in industry, it frequently becomes an expedient to circulate a series of laden carriers in a track circuit having various stopping points and work areas therealong in which materials can be added, unloaded, processed, replaced, and fabricated as desired. Exclusively manual operation and control over the carriers in such areas is necessary whereas there are usually other areas in the circuit where the possibility for an automatic system of operation for advancing the carriers presents itself. It is a broad object of the present invention to provide such an automatic system for the operation and control of track-borne carriers. A specific object is to provide an automatic sectional control system for track-borne carriers in which an overriding manual control is at all times available. Another specific object is to provide such a system as aforesaid for automatically advancing the carriers, but at the same time maintaining a proper distance between carriers so as to prevent pile-ups and bumping between successive units.

A further object is to provide an electrified railway in which the respective succeeding carriers have connections to a power source which are interrupted whenever the next preceding carrier occupies the rails immediately ahead. To this end, the rails are divided in effect into separate operating blocks corresponding to separate control track sections side by side therewith, and each of the respective block areas is kept occupied by operation of a corresponding control track section so long as and only so long as the next block remains occupied. When such next block is vacated, the just-named control track section operates to cause a reoccupation of the same by automatically advancing a subsequent available carrier thereinto.

According to another feature of the invention, a sectionalized block system of track for material carriers is provided in which some sections are automatically controlled and in which other sections are not under automatic control and yet a manual control is provided which is effective at all sections and which can at all times effectively override the automatic controls.

Further features, objects and advantages will either be specifically pointed out or become apparent when for a better understanding of the invention, reference is made to the following written description taken in conjunction with the accompanying drawings in which:

Figure 1 is a perspective showing of a portion of a carrier system according to the present invention;

Figure 2 is a side elevational view of a carrier;

Figure 3 is a front elevation of a carrier partly in section;

Figure 4 is a perspective view of the control section of the system;

Figure 5 is a wiring diagram of the system;

Figures 6–10 represent diagrammatic showings of the operation of the system; and Figure 11 is a diagrammatic showing of a modified track layout.

In Figures 1, 2, and 3 of the drawings, a typical materials carrier A similar to other carriers of a series of carriers according to the invention, has a frame-like chassis, and is provided with a set of four load-carrying wheels 10 which are disposed on one side of a single rail 12, preferably an I beam. Another set of four load-supporting wheels 14 for the carrier is provided on the opposite side of the rail 12, each wheel thereof being connected to a companion wheel 10 of the first set by means of a yoke 16 in which the axles of the wheels 10 and 14 are journalled. The wheels 10 and 14 are arranged to roll along the inside of a lower flange 18 of the I beam rail 12. The rail 12 is supported from a roof truss 20 so as to provide an overhead installation, and the rail 12 is secured thereto by means of a plurality of brackets 22 and bolts 24 which occur at spaced intervals along the rail 12. The rail 12 preferably defines a closed loop of track forming a circuit along which the carrier A moves. The chassis of the carrier A is suspended by means of a plurality of pin or trunnion joints 26 attached to the wheel and yoke structure 10, 14, and 16. A hoist motor 28 is secured to the chassis of the carrier A and by suitable gearing is drivably connected to a hoist 30 containing a reel on which a coil of cable 32 is received. The cable 32 terminates in a hook 34 suitable for receiving a materials-carrying sling 36. A jet engine 38, illustrated by way of example for the purposes of the present disclosure, has a pair of eyes 40 to which the sling 36 is connected at its ends. Instead of the jet engines 38, containers for materials might also be provided with suitable eyes 40 and suspended from the sling 36 as comprehended within the broader aspects of the present invention. The hoist motor 28 is manually controlled by a pendant control 42 providing an up-button 46 and a down-button 48. The buttons 46 and 48 operate switches which are connected through a flexible electrical conduit 44 to a control box 50 and control circuits therethrough. The control box 50 is in turn connected by means of a conduit 52 to the switch-controlled hoist motor 28. The control box 50 is also connected to a propulsion drive motor 54, which through suitable gearing drives a propulsion drive wheel 56 engaging the outside of the lower flange 18 of the rail 12. It is through the appropriate operation of the drive wheel 56 that the carrier is moved under power in either direction along the rail 12.

The rail 12, forming a closed loop of track as previously noted, is provided at its outboard side with a three-phase power line P which is spaced thereto and located at all points therealong. The power line P has a hollow case of a generally inverted U-shape section containing three spaced-apart conductors 57, 58, and 59 and being open at the bottom by reason of a longitudinally continuous slot 60 formed therein. The hollow case of the power line P slidably receives a trolley 62 supported on a set of wheels 63 for rolling movement therein and having a plurality of contactor members 64, 65 and 67 respectively cooperating as current collectors with conductors 57, 58, and 59. The contactor members 64, 65, and 67 are preferably of the shoe type and constitute power shoes for operating both the hoist motor 28 and the propulsion drive motor 54.

The power line P and the chassis of the carrier unit A have an interposed linkage 66 which mechanically coordinates movement between the two units. A flexible electrical conduit 68 connects the power trolley 62 to the motors 28 and 54 through suitable relay-actuated control contacts. Manual control over the operation of the propulsion motor 54 is provided for through use of a set of three push buttons MF, MR, MS located on the pendant control 42 on the face opposite to the hoist buttons 46, 48. An upper push button MF is operator-operated to produce manual forward movement of the carrier A, the lower push button MR is operator-operated to produce manual reverse movement of the carrier A, and the middle push button MS is operator-operated for manually insuring or causing deenergization of the propulsion drive motor 54 of the carrier A.

The rail 12 is provided at its inboard side with a control section S which is spaced thereto and located at all points therealong. The control section S is suspended from the roof truss 20 by means of a plurality of brackets 70, while the outboard power line P is similarly supported from the roof truss by means of a plurality of like brackets 69. The control section S has a hollow casing of a generally inverted U-shape containing three spaced apart conductors 71, 72, and 73 and being open at the bottom by reason of a longitudinally continuous slot 74 formed therein. A control trolley 75 is supported on a set of wheels 77 within the case of the control section S and rolls along the inside thereof. The control trolley 75 has a plurality of contactor members 78, 79, and 81 thereon which slidably cooperate with conductors 71, 72, and 73 respectively. The contactors 78, 79, and 81 are preferably of the shoe type and constitute control shoes used for automatic operation of the drive motor 54. The section unit S and the chassis of the carrier unit A are provided with an interposed linkage 83 which mechanically correlates movement of the two units. A flexible electrical conduit 82 connects the control trolley 75 to the control box 50.

In Figures 4 and 5, the control section S is formed of a plurality of individual control sections S1, S2, S3, S4, S5 laid end to end to one another. These control sections which may be five in number or more or less as desired, are disposed on the inboard side of the rail 12 which is opposite to the side on which the power line P is located. The demarcations noted between the individual control sections in effect divide the continuous rail 12 into separate operating blocks OB1, OB2, OB3, OB4, OB5 each corresponding to an adjacent control section S1, S2, S3, S4, S5 respectively. The individual conductors 71, 72, and 73 in the section S1 are secured at their end by means of one or more bolts 76' to an insulator 76 which is provided with a transverse peripheral protrusion 80a. The transverse protrusion 80a of the insulator 76 electrically separates each conductor 72 in the section S1 from a corresponding adjacent conductor 72 in the control section S5. Thus a gap 80 is provided between the ends of the conductors of one section and the ends of the conductors of the next successive section, and unless jumpers are provided as in the exceptions hereinafter noted, the corresponding conductors between sections are electrically independent one of the other. A control trolley contactor member 78' appears in a dotted line phantom showing in Figure 4 from which it will be perceived that the shoe is slightly wider than the lateral protrusion 80a of the insulator 76 and hence the shoe, when in the middle, can more than adequately bridge and close the gap 80 between respective ends of the corresponding conductors 71, 72, and 73 in the successive control sections.

As the power trolley 62 advances along the power line P, the individual contactor members 64, 65, and 67 contact the upper, middle and lower power line conductors 57, 58, and 59 respectively. The contactor members 64, 65, and 67 are connected to the propulsion drive motor 54 through motor controls including a set of relay-actuated control contacts $R_{1-2}$, $R_{1-3}$, $R_{1-4}$ respectively, and $R_{2-2}$, $R_{2-3}$, and $R_{2-4}$ respectively. The connection between the relay contacts just noted and the motor 54 includes a thermal overload relay winding R6 and R7, each of which heats up when carrying excessive current.

Through suitable connections, a transformer 86 is provided which is energized from the middle and lower conductors 58 and 59 which in turn receive power through a switch 82 forming an interruptable circuit to a three-phase power source 84 preferably energized at 440 volts. The transformer 86 has a pair of output conductors 88 and 90. The transformer output conductor 88 includes a normally closed switch 92 which is ganged with another normally closed switch 94 under control of the manual stop push button MS located in the pendant control 42 for the carrier A shown in Figures 1–3.

The output conductors 88 and 90 are connected by one circuit therebetween which includes the operator-operated manual forward switch MF, a normally closed set of relay contacts $R_{2-1}$, the switch 94, a relay R1, and sets of normally closed relay contacts $R_{6-1}$, $R_{7-1}$ in series with one another. The conductors 88 and 90 have another interconnection including an operator-operated manual reverse switch MR, a normally closed set of relay contacts $R_{1-1}$, a relay R2, and sets of normally closed relay contacts $R_{6-2}$ and $R_{7-2}$ in series. The relay contacts $R_{6-1}$, $R_{6-2}$ are mounted on a bimetallic arm and are under control of the thermal overload relay winding R6 previously noted. The relay contacts $R_{7-1}$, $R_{7-2}$ are similarly mounted and are similarly controlled by the thermal overload relay winding R7.

The relay R1 is the controlling means for the normally closed relay control contacts $R_{1-1}$ and the relay R2 is the controlling means for the normally closed set of relay control contacts $R_{2-1}$, and these relays coact in the circuit to establish mutual cooperation as follows. Whenever the normally open manual switch MF is closed for producing forward operation of the propulsion drive motor 54, the relay R1 becomes energized and actuates the normally closed set of relay contacts $R_{1-1}$ so as to completely prevent energization of the relay R2. At the same time, the energized relay R1 also closes the relay control contacts $R_{1-2}$, $R_{1-3}$, and $R_{1-4}$ so as to connect the drive motor 54 to the power line P for forward operation of the drive motor. Conversely, when the operator-operated manual reverse switch MR is closed, the relay R2 is energized so as to actuate the normally closed contacts $R_{2-1}$ and prevent the forward relay R1 from becoming energized. At the same time, the energized relay R2 closes the normally open relay contacts $R_{2-2}$, $R_{2-3}$, and $R_{2-4}$ so as to connect the drive motor 54 to the power line P and operate the motor 54 in reverse. In the latter instance, the carrier will back up along the track 12.

Operator operation of the manual stop switch MS will actuate the switch 92 to open position and prevent operation of the reverse relay R2 and will further actuate the switch 94 to open position and prevent operation of the forward relay R1. The relays R1, R2 are also prevented from being energized when the thermally sensitive bimetal arms and contacts $R_{6-1}$, $R_{6-2}$, $R_{7-1}$, $R_{7-2}$ are actuated by heat produced by the protective overload windings R6, R7 due to excessive current carried thereby to the drive motor 54.

As the control trolley 75 moves along the control section S, the contactor members 78, 79, and 81 each cooperate with and slide along a corresponding one of the control conductors 71, 72, and 73 respectively, namely, the upper control conductor, the middle control conductor, and the lower control conductor. The upper contactor member 78, a current collector, contacts the upper control conductor 71 and at the same time is connected by means of a conductor 96 to the normally closed set of relay contacts $R_{2-1}$. The lower contactor member 81 slidably contacts the lower control conductor 73 and is at the same time connected by means of a conductor 98 to the transformer output conductor 90 and thence to the relay contacts $R_{7-1}$. An automatic operating circuit is thus made available for the forward control relay R1.

The middle contactor member 79 slidably cooperates with the middle conductor 72 and is also connected to the lower contactor member 81 so as to form and complete any circuit commonly leading to the lower conductor 73 and to the middle conductor 72.

A transformer 102 is provided which is energized from the same middle and lower phases 58 and 59 of the power line P as is the previously noted transformer 86. The purpose of this similar connection is to prevent any shorting of the respective phases 58 and 59 in the power line P. The transformer 102 has a pair of output conductors 100 and 106. Each upper conductor 71 in the control sections S2, S3, and S4 is connected to the transformer output side 100 by means of respective sets of normally closed relay contacts $R_{3-1}$, $R_{4-1}$, and $R_{5-1}$. The middle conductor 72 of each of the sections S1, S2, and S3 is connected to the output side 106 of the transformer 102 by means of circuits which respectively include intervening relays R3, R4, and R5. The lower conductor 73 of the section S1 and also, through the medium of a series of jumpers 103, 104, and 105 the lower conductors 73 of the sections S2, S3, and S4, respectively, are connected directly to the output side 106 of the transformer 102.

In the operation of the electrical system according to Figure 5, it will become apparent that upon manual operation of the carrier A into the operating block OB4 corresponding to the control section S4, the upper control contact member 78 serving as current collector will contact the energized upper conductor 71 in the section S4 and close a circuit through the relay R1, which is completed to the transformer 102 by means of the conductor 98, the lower contactor member 81, the lower conductor 73 in the section S4, and the succeeding jumpers 104 and lower conductors 73 of the control sections leading to the output side 106 of the transformer 102. Energization of the relay R1 will cause automatic closing of the motor control contacts $R_{1-2}$, $R_{1-3}$, $R_{1-4}$ and cause the drive motor 54 to advance the carrier A automatically under power into the operating block OB3 corresponding to the control section S3. While the control trolley 75 is in the control section S3, the upper contactor member 78 serving as current collector, cooperates with the upper control conductor 71 and continues to energize the forward relay R1 so as to keep the propulsion motor 54 under power and driving forwardly. At the same time, however, the middle contactor member 79 and the lower contactor member 81 complete a circuit between the middle and lower conductors 72 and 73 in the section S3 thereby energizing the relay R5 and causing the normally closed relay contacts $R_{5-1}$ controlled thereby to open and deenergize the upper energized control conductor 71 in the control section S4.

The complete circuit for the relay R5 when the trolley 75 is in the control section S3 forms a connection between the secondary of the transformer 102 and the coil R5. One side of the transformer 102 is connected to one side of the relay coil R5 through the conductor 100, and the other side of the secondary of the transformer 102 is connected to the other side of the coil R5 through the conductor 106, through the lower conductor 73 of the section S1, through the jumper 103, through the lower conductor 73 of the section S2, through the jumper 104, through the conductors 73 and 72 of the control section S3, which are in turn interconnected by the contactors 79 and 81, and through the line extending from the intermediate conductor 72 of the section S3 to the other side of the coil R5.

The drive motor 54 continues to drive forwardly and advance the carrier A into the control section S2 at which time two opposite results occur in the control sections S3 and S4. In the circuit for the control section S3, the normally closed set of relay contacts $R_{4-1}$ is caused to open owing to actuation of the relay R4, and the control section S3 is deenergized whereas inasmuch as the middle and the lower contactor members 79 and 81 of the control trolley 75 have vacated the control section S3, the relay R5 is deenergized with the consequence that the normally closed relay contacts $R_{5-1}$ close and reenergize the upper conductor in the control section S4. Accordingly, any subsequent carrier B similar to the carrier A which enters into the section S4 will be automatically operated and advanced through the live section S4 until it reaches the dead section S3. Meanwhile, the carrier A still being automatically advanced, vacates the section S2 and proceeds into the control section S1 in which it will be noted the upper conductor 72 is independent of all electrical circuits and not energized. Accordingly, the upper current collector contactor member 78 reaches a dead circuit and permits the forward relay R1 to become deenergized so as to permit the control contacts $R_{1-2}$, $R_{1-3}$, and $R_{1-4}$ to open and deenergize the drive motor 54. At the same time in the control section S1, the middle and lower contactor members 79 and 81 complete a circuit through the relay R3 thus opening the normally closed relay contacts $R_{3-1}$ so as to deenergize the operating circuit available at the control section S2. It will be apparent that as the carrier A moves into the section S1 from the section S2, the section S3 will again become energized. By way of summary and to assume the carrier A in the operating block OB3 such that the control trolley 75 occupies the control section S3, it will be perceived that no automatic operation of a subsequent carrier can occur in the preceding control section S4 so long as the control section S3 is occupied by the control trolley 75 and further, that the automatic operating circuit available in the control section S3 will remain deenergized at all times that the succeeding control section S2 is occupied by another control trolley. When the control section S2 is caused to be vacated, the operating circuit available at the control section S3 will cause the relay controlling means R1 to actuate the motor control relay contacts $R_{1-2}$, $R_{1-3}$, and $R_{1-4}$ so as to propel the motor 54 and the carrier A forwardly toward section S2.

In the sequential Figures 6, 7, 8, 9, and 10, the operation of a system of carriers A, and B, C, D, each of which is similar to the carrier A already considered, is chronologically presented. The closed loop of track 12 is marked off in effect by the occurrence of the control section gaps 80 into separate operating blocks OB1, OB2, OB3, OB4, and OB5 corresponding to the control sections S1, S2, S3, S4, S5 already described.

In an illustrative example presently given of a jet engine manufacturing and testing operation during which the jet engines 38 are transported by a system of wheeled carriers, the operating block OB1 may be used as a loading area in which a newly completed jet engine from a nearby assembly line is loaded onto a carrier as each carrier becomes available. After the various carriers A, B, C, and D are loaded with the newly assembled jet engines, the carriers, for purposes of unloading, are advanced under manual control through operation of the pendant control 42 into the operating block OB5 generally designated as a work area. Such a work area is accessible to jet engine test stands, and an operation comprehending jet engine disassembly, parts inspection for failures, and finally reassembly. After the engines are unloaded, satisfactorily pass their tests, and pass an internal inspection for structural failures, the engines are reassembled and reloaded onto the various carriers A, B, C, D, while still in the work area.

In Figure 6, after the carriers A, B, C, D, each receive a reassembled jet engine, the carrier A is advanced under manual operation into the operating block OB4 where automatic operation takes place. Inasmuch as every one of the subsequent operating blocks OB1, OB2, OB3, is vacant, the carrier A will be automatically advanced through the successive blocks until such time as it moves into the dead operating block area OB1 indicated as the loading area. The advanced position of the carrier A, according to the foregoing, is shown in Figure 7. Then the carrier B may be advanced under manual control until it enters the automatic operating block OB4 whereupon the carrier B will be automatically advanced under its own power into the operating block OB2. This advanced position for the carrier B is shown in Figure 8 and it will be appreciated that the operating block OB2 becomes deenergized as soon as the previous block OB1 was occupied by the carrier A such that the carrier B is automatically caused to roll to a stop in the operating block OB2. In the position shown for the carrier A in Figure 8, the reassembled jet engine 38 thereof may be removed and crated for shipping. The carriers C and D may be advanced in that order into the operating block OB4 whereupon the carrier C will automatically be advanced to the operating block OB3 as shown in Figure 9, and the carrier D will remain idle in the operating block OB4 inasmuch as the operating circuit controlling the same is deenergized by reason of the fact that the succeeding operating block OB3 is already occupied by the carrier C in accordance with the present illustrative example.

In Figure 9, a newly assembled jet engine 38 may be loaded onto the carrier A, whereas the already tested and reassembled jet engine from the carrier B may be removed therefrom and crated for shipping. Now if the carrier A is manually operated out of the operating block OB1 into the operating block OB5 of the work area, the operating block OB2 is caused to be reenergized so as to cause the carrier B to move forwardly into the operating block OB1 and then in sequence the carrier C is caused to be moved forwardly into the now vacant operating block OB2, and the carrier D is automatically caused to be advanced into the just vacated operating block OB3, all as shown according to Figure 10 of the drawings.

In Figure 10 it will be further seen that the tested and reassembled jet engines from the carriers C and D may be removed for crating and shipping, whereas in the position of carrier B, a newly assembled jet engine may be loaded thereon preparatory to further manual operation of the carrier B and recontinuation of the cycle.

In Figure 11 a modified form of track layout is shown having a rather extensively long operating block OB4 but corresponding in other respects to the control system and operating blocks of the preceding embodiment of Figures 1–10. In Figure 11, a carrier E, similar to the carrier A, occupies an operating block OB1, a similar carrier F occupies an operating block OB2, a similar carrier G occupies an operating block OB3, and a plurality of similar carriers H, I, J, K, L occupies the operating block OB4.

The operation of the carriers in Figure 11 is similar in most respects to the operation of the preceding embodiment in that when the carrier E is manually caused to vacate the operating block OB1, the carrier F is automatically energized and advanced into the operating block OB1. Immediately, the carrier G is energized and advanced into the operating block OB2 thus leaving the operating block OB3 vacant. Thereupon the entire operating block OB4 is energized and all the carriers H, I, J, K, L, are operated and advanced, maintaining the same relative distance therebetween, until such time as the lead carrier H occupies the operating block OB3. Thereupon the operating block OB4 is deenergized and the carriers I, J, K, L, roll to a halt. Thereafter at any time the operating block OB3 is vacated, all carriers remaining in the operating block OB4 will be automatically advanced until such time as the lead carrier thereof advances into the operating block OB3. It will thus be seen that an accurate station and proper distance is maintained at all times between the carriers regardless of how many carriers tend to become accumulated in the first of the series of the automatically operated operating blocks.

As herein disclosed, the invention is shown to embody a closed loop of track around which a series of track-borne materials carriers is circulated. It is evident, however, that many features of the invention, particularly the safety features, are applicable to passenger and livestock carriers which move on unclosed lengths of track from one destination to another. So also the drawing shows a single overhead rail which supports the wheels of wheeled carriers but self-evidently, a multirail system of electrified ground-laid trackage may be advantageously employed to incorporate the features of the present invention. There are presently shown five control sections, and five operating blocks of track and five operating blocks of three-phase power line corresponding thereto but indeed, it is not essential to the instant invention that five sections and blocks be used and more or less than that number can be equally well employed and also two-phase or single phase power may be used within the contemplation of the present invention. The automatic controls of the present carrier system are designed only for forward operation of the carriers, but it is apparent that by interchanging the relays R1 and R2, a backward automatic operation can just as easily be achieved. Within the broader aspects of the invention, additional relay control contacts may be provided for the relays R1 and R2 and connected to a brake means, not shown, so as to apply positive braking to the wheels of the carriers whenever the drive motor 54 of the carrier is deenergized owing to interruption of the power circuit due to opening of the relay contacts $R_{1-2}$, $R_{1-3}$, $R_{1-4}$, $R_{2-2}$, $R_{2-3}$, and $R_{2-4}$.

Variations within the spirit and scope of the described invention are equally comprehended by the foregoing description.

What is claimed is:

1. In a rail carrier control system comprising a track, a carrier suspended from said track, said carrier including an electric motor, a drive means for drivably interengaging said electric motor and said track, electric power lines axially disposed adjacent said track, and conductor means slidably contacting said electric power lines for transferring electric power from said lines to said electric motor; an automatic control means for regulating said transfer of electric power to said electric motor, said control means comprising a series of conductors disposed parallel to said track in groups, a first and a second conductor of the individual groups being electrically insulated from the corresponding first and second conductors of adjacent groups, a plurality of power transmission means for individually transferring power from said electric power lines to said first one of each group of conductors, each of said transmission means including a relay switch, a plurality of other conductors individually electrically connecting said electric power lines with said second one of each group of conductors, said other conductors each including a relay coil in series therewith, the relay coil for a certain one group of conductors being adapted to individually actuate the relay switch in the individual transmission means for an adjacent one of said groups, a third conductor for each group being electrically connected in series with said electric power lines, contactor means carried by said control means slidably contacting and forming a connection between the second and third conductors of said certain one of said groups, a switching circuit including a control lead slidably contacting the first conductor of said certain one group, a control relay coil connected in series with said control lead, motor relay switches interposed in series in said conductor means and operatively coupled to said control relay coil for actuation thereby, and manually actuated switch means in said control lead for energizing and deenergizing said control relay coil.

2. A control system as set forth in claim 1 wherein said switching circuit includes a second control lead interconnecting said contactor means and said control relay coil.

3. In a control system for an electric rail carrier including a rail, carrier structure supported thereby, a motor means within said structure for powering the same, electric power lines disposed adjacent said rail for supplying electric power to said motor means, groups of conductor segments disposed in end to end relationship in a series with three conductor segments of one of the series having corresponding segments in an adjacent one of the series, an electric power means connected to said power lines, a relay coil, one conductor in one of said groups being electrically connected to said power lines through a circuit including said relay coil, a relay switch coupled to said relay coil and actuated thereby, said relay switch being connected to a second conductor in an adjacent one of said groups, the first and second conductor segments of one group being electrically insulated from the corresponding first and second conductor segments of an adjacent group, a third conductor in each one of said series connected to said power lines, a switching circuit carried by said carrier having an electric lead, first contactor means in said lead for simultaneously contacting and interconnecting said one conductor and its associated third conductor for closing the relay coil circuit thereby actuating said relay switch and deenergizing said second conductor in said adjacent group, said switching circuit further including a motor relay switch means for controlling the transfer of electric power to said motor means, a first relay coil adjacent said relay switch means for actuating the same, a second electric lead, and second contactor means for sequentially connecting said second lead to said second conductor and to the corresponding second conductor of each adjacent group.

4. A control system as set forth in claim 3 wherein said switching circuit further includes a second motor relay switch means for reversing the polarity of said motor means, a second relay coil adjacent said second relay switch means for actuating the same, and manual switch means for selectively energizing either of said first and second relay coils.

5. A control system as set forth in claim 3 wherein said segments each consist of a plurality of similarly situated conductors and wherein said motor means is adapted to move said carrier along said rail, said first and second contactor means being moved thereby from contact with the said conductors of one segment into contact with the corresponding conductors in an adjacent segment.

References Cited in the file of this patent

UNITED STATES PATENTS

| | | |
|---|---|---|
| 2,084,879 | Weise | June 22, 1937 |
| 2,201,013 | Rosenthal | May 14, 1940 |
| 2,385,917 | Harwood et al. | Oct. 2, 1945 |
| 2,614,506 | Mullenheim | Oct. 21, 1952 |
| 2,688,931 | Spafford | Sept. 14, 1954 |
| 2,688,934 | Quail | Sept. 14, 1954 |

FOREIGN PATENTS

| | | |
|---|---|---|
| 8,283 | Austria | Jan. 15, 1902 |
| 382,973 | Great Britain | Nov. 10, 1932 |